(12) United States Patent
Jeromin et al.

(10) Patent No.: US 11,103,798 B1
(45) Date of Patent: Aug. 31, 2021

(54) SYSTEMS AND METHODS FOR DETECTING DATA CORRESPONDING TO FLUID STREAM

(71) Applicant: Universal City Studios LLC, Universal City, CA (US)

(72) Inventors: Aaron Chandler Jeromin, Winter Garden, FL (US); Akiva Meir Krauthamer, Orlando, FL (US); Elam Kevin Hertzler, Winter Garden, FL (US); Andrew Brian Raij, Winter Park, FL (US); Victor Alexander Lugo, Belle Isle, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/827,336

(22) Filed: Mar. 23, 2020

Related U.S. Application Data

(60) Provisional application No. 62/983,998, filed on Mar. 2, 2020.

(51) Int. Cl.
   *G08B 5/36* (2006.01)
   *A63G 31/00* (2006.01)
   *G06F 16/9035* (2019.01)

(52) U.S. Cl.
   CPC ....... *A63G 31/007* (2013.01); *G06F 16/9035* (2019.01); *G08B 5/36* (2013.01)

(58) Field of Classification Search
   CPC ........ A63G 21/00; A63G 21/18; A63G 31/00; A63G 31/007; B08B 3/00; B08B 3/02
   USPC .............................. 472/13, 117, 128
   See application file for complete search history.

(56) References Cited

U.S. PATENT DOCUMENTS

| 5,411,269 A | 5/1995 | Thomas |
| 5,785,592 A | 7/1998 | Jacobsen |
| 2011/0111871 A1 | 5/2011 | Legary et al. |
| 2019/0054201 A1* | 2/2019 | Zhang ................. A61L 2/10 |
| 2019/0358550 A1* | 11/2019 | Helmick ............ G01F 23/0069 |

FOREIGN PATENT DOCUMENTS

| CN | 108854090 A | 11/2018 |
| WO | 2018072808 A1 | 4/2018 |

OTHER PUBLICATIONS

PCT/US2021/020323 International Search Report and Written Opinion dated Jun. 11, 2021.

* cited by examiner

*Primary Examiner* — Kien T Nguyen
(74) *Attorney, Agent, or Firm* — Fletcher Yoder, P.C.

(57) ABSTRACT

An attraction system includes a fluid source configured to emit a fluid stream with a geometry that facilitates internal reflection, a transmitter configured to transmit a signal through the fluid stream such that the signal is enclosed in the fluid stream via internal reflection and the signal comprises a parameter, a sensor configured to receive the signal via the fluid stream and provide data indicative of the parameter, and a control system communicatively coupled to the sensor. The control system includes a processor and a memory, and the memory includes instructions that cause the processor to receive the data indicative of the parameter from the sensor, and operate the attraction system based on the parameter.

20 Claims, 4 Drawing Sheets

SYSTEMS AND METHODS FOR DETECTING DATA CORRESPONDING TO FLUID STREAM

CROSS REFERENCE TO RELATED APPLICATIONS

This application claims priority from and the benefit of U.S. Provisional Application Ser. No. 62/983,998, entitled "SYSTEMS AND METHODS FOR DETECTING DATA CORRESPONDING TO FLUID STREAM" and filed Mar. 2, 2020, which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Amusement or theme parks include various features that each provides a unique experience for guests of the amusement park. For example, the amusement park may include different attractions, such as a roller coaster, a motion simulator, a drop tower, a performance show, a log flume, and so forth. The amusement park may also have various features, such as show effects, interactive activities, and the like, to enhance the unique experience provided to the guests. Such features may be included in the attractions and/or throughout the amusement park to entertain the guests. With the increasing sophistication and complexity of amusement park features, there is an increased expectation of entertainment quality among amusement park patrons and guests. Therefore, improved and creative amusement park features are desirable. For example, it is now recognized that there is a need for improved operation of features that use liquid or fluid, such as attractions that utilize water cannons.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an attraction system includes a fluid source configured to emit a fluid stream with a geometry that facilitates internal reflection, a transmitter configured to transmit a signal through the fluid stream such that the signal is enclosed in the fluid stream via the internal reflection and the signal comprises a parameter, a sensor configured to receive the signal via the fluid stream and provide data indicative of the parameter, and a control system communicatively coupled to the sensor. The control system includes a processor and a memory, and the memory includes instructions that cause the processor to receive the data indicative of the parameter from the sensor, and operate the attraction system based on the parameter.

In an embodiment, a fluid system includes a fluid source configured to emit a fluid stream having a geometry that facilitates the internal reflection, a target configured to receive the fluid stream emitted by the fluid source, a transmitter configured to transmit a signal into the fluid stream such that the signal travels through the fluid stream via internal reflection and the signal comprises a parameter, a sensor configured to receive the signal via the fluid stream and to transmit data based on the signal, and a control system communicatively coupled to the sensor. The control system includes a processor and a memory, and the memory includes instructions that cause the processor to receive the transmitted data from the sensor, determine the parameter based on the transmitted data, and operate the fluid system based on the parameter.

In an embodiment, an attraction system includes a first fluid source configured to emit a first fluid stream capable of internal reflection, a first transmitter configured to transmit a first signal having a first parameter through the first fluid stream via the internal reflection, a second fluid source configured to emit a second fluid stream capable of internal reflection, a second transmitter configured to transmit a second signal having a second parameter through the second fluid stream via the internal reflection, a target comprising a first sensor configured to receive signals including the first signal through the first fluid stream and the second signal through the second fluid stream, and a control system communicatively coupled to the first sensor. The control system includes a processor and a memory, and the memory includes instructions that cause the processor to receive data from the first sensor, in which the data is indicative of a received parameter of a received signal, identify the first fluid source when the received parameter correlates to the first parameter, and identify the second fluid source when the received parameter correlates to the second parameter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
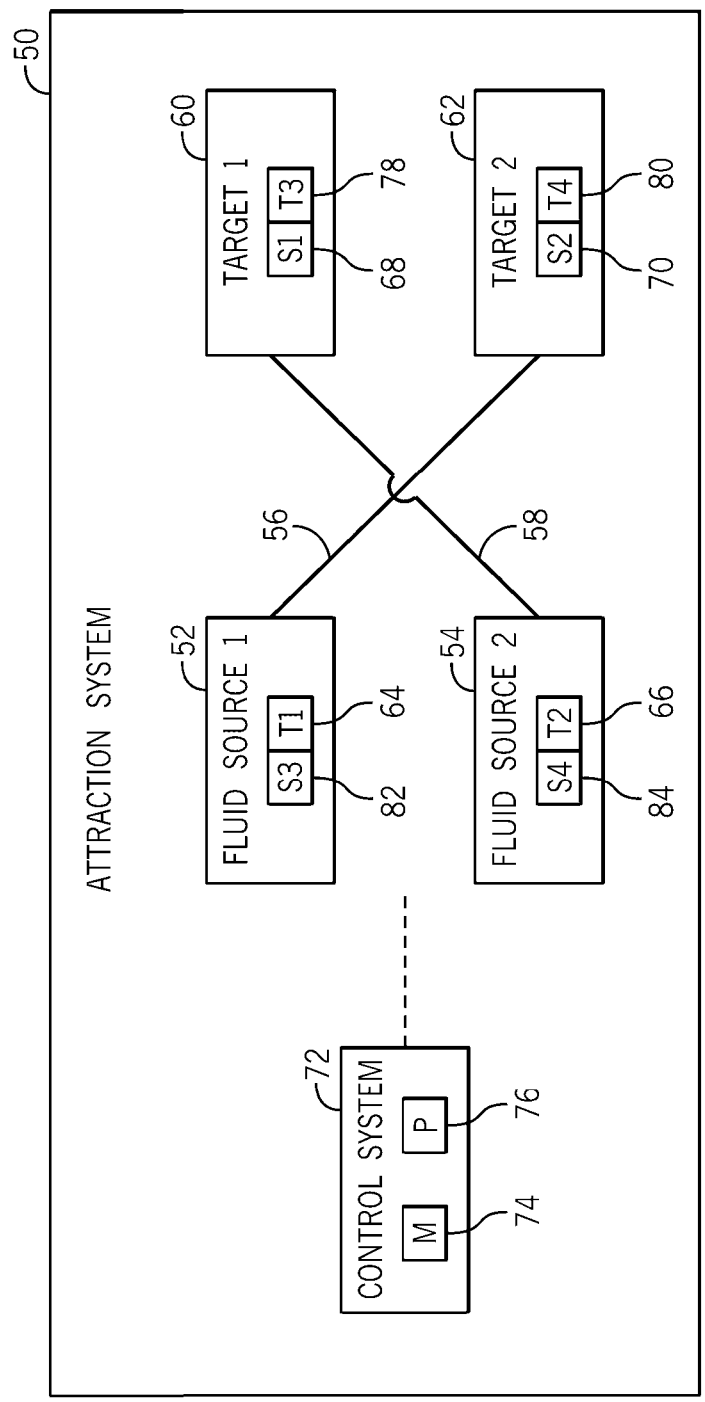
FIG. 1 is a block diagram of an attraction system having various fluid sources that may each emit a fluid stream, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to systems and methods for transmitting data via a fluid stream or flow. As used herein, the fluid includes a liquid, such as water, oil, and the like. The fluid stream may be provided in an entertainment venue, such as an amusement or theme park. Indeed, the fluid stream may be used for a show effect by an attraction, show, or activity to entertain guests of the entertainment venue. Specifically, the fluid stream may be used in a target-based attraction in which the fluid source (e.g., a water cannon) operates to emit the fluid stream, such as toward a target. The emission of the fluid stream may be initiated via manual controls, such as by a trigger actuated by one of the guests, or automatically, such as by a pre-programmed controller. In any case, it may be desirable for the fluid source to emit the fluid stream in a particular manner, such as toward a specific target among a set of targets.

It is now recognized that, in conventional approaches to such target-based features that employ fluid sources, it may be difficult to determine whether the target is receiving a particular fluid stream. For example, multiple fluid sources may emit respective fluid streams at or near a same target, and it may be difficult to determine which of the fluid streams successfully hits the target. Specifically, for example, multiple users may have assigned water cannons and each water cannon may be employed to try to strike one or more targets with a water stream. Where multiple streams of fluid are being emitted from multiple sources, it can be difficult to ascertain which source provided a successful strike on a target. As a result, actions specific to the fluid source that successfully hits the target (e.g., awarding points to the fluid source) may not be performed with sufficient accuracy.

Accordingly, providing each fluid stream with unique characteristics may enable the fluid streams to be distinguishable from one another. As such, embodiments of the present disclosure are directed to systems and methods for transmitting a signal through a fluid stream and receiving the signal via the fluid stream. In one embodiment, the signal includes a parameter associated with a fluid source, and a sensor may receive the signal via the fluid stream to determine the parameter and thus the fluid source. For example, multiple fluid streams may be associated with respective signals having unique parameters, and the sensor may receive any of the signals via the multiple fluid streams. The sensor may further determine the parameter of a received signal to determine the particular fluid source associated with the fluid stream received by the sensor. In this way, in addition to determining that the sensor receives the fluid stream, information regarding the specifically received fluid stream and/or its fluid source may also be determined. As a result, further actions may be performed based on the received fluid stream.

With the preceding in mind, FIG. 1 is a block diagram of an attraction system 50 of an amusement park, according to embodiments of the present disclosure. The attraction system 50 may be any suitable part of the amusement park that provides features to entertain guests, such as a particular ride (e.g., a roller coaster, a drop tower), another attraction (e.g., a performance show), a designated area of the amusement park, and the like. The illustrated attraction system 50 includes a first fluid source 52 and a second fluid source 54 to entertain the guests, but the attraction system 50 may include any suitable number of fluid sources in an additional or alternative embodiment. As an example, the fluid sources 52, 54 may include a water gun, a fountain, a water cannon, a hose, another suitable type of fluid source, or any combination thereof. Each fluid source 52, 54 may emit a respective fluid stream. That is, the first fluid source 52 may emit a first fluid stream 56, and the second fluid source 54 may emit a second fluid stream 58. As an example, the fluid sources 52, 54 may be located on a ride vehicle of the attraction system 50, equipped by guests of the attraction system 50, implemented on a prop of the attraction system 50, and so forth. The illustrated attraction system 50 further includes a first target 60 and a second target 62. Each of the targets 60, 62 may receive any of the fluid streams 56, 58 from the respective fluid sources 52, 54. As illustrated, the first fluid stream 56 emitted by the first fluid source 52 is directed to the second target 62, and the second fluid stream 58 emitted by the second fluid source 54 is directed to the first target 60, but additionally or alternatively, the first fluid stream 56 may be directed to the first target 60 and/or the second fluid stream 58 may be directed to the second target 62. Indeed, the fluid streams 56, 58 may also be directed at the same target 60, 62.

In some cases, it is desirable to determine whether the targets 60, 62 are receiving any of the fluid streams 56, 58. In an example, the attraction system 50 is a decorative prop, such as a fountain, in which the fluid sources 52, 54 are setup (e.g., positioned, oriented) with the intention of directing the respective fluid streams 56, 58 for receipt by the targets 60, 62. Thus, it is desirable to determine that the targets 60, 62 are receiving the corresponding fluid streams 56, 58 to determine that the fluid sources 52, 54 are setup accurately (e.g., for aesthetic purposes). In another example, the attraction system 50 is an interactive attraction in which guests may control the fluid sources 52, 54 and are trying to direct the fluid streams 56, 58 to hit the targets 60, 62. For instance, the targets 60, 62 may be located on an interactive prop (e.g., an entertainment figure), a ride vehicle, and/or other guests. In this case, it may also be desirable to determine which of the fluid streams 56, 58 are being received by the targets 60, 62 to store further information, such as information associated with the respective fluid sources 52, 54 (e.g., to award points to guests).

For these reasons, each of the fluid sources 52, 54 may output a signal that is encoded into the respective fluid streams 56, 58. Accordingly, the first fluid stream 56 emitted by the first fluid source 52 includes a first signal, which may be uniquely associated with (e.g., include a unique identifier of) the first fluid source 52. Moreover, the second fluid stream 58 emitted by the second fluid source 54 includes a second signal, which may be uniquely associated with (e.g., include a unique identifier of) the second fluid source 54. To this end, the first fluid source 52 may include a first transmitter 64 that may output the first signal into the first fluid stream 56, and the second fluid source 54 may include a second transmitter 66 that may output the second signal into the second fluid stream 58. As the fluid streams 56, 58 are directed along a fluid flow path (e.g., to the targets 60, 62), the respective signals may remain contained within the fluid streams 56, 58. In other words, the signals travel along the respective flow paths of the fluid streams 56, 58. In addition, each of the targets 60, 62 may receive the respective signals of the fluid streams 56, 58. For example, the first target 60 may include a first sensor 68 that may detect a received signal, and the second target 62 may include a second sensor 70 that may detect a received signal. That is, upon receipt of one of the fluid streams 56, 58, the sensors 68, 70 may determine the presence of the signal encoded in the fluid stream 56, 58. In this way, the presence of a detected signal indicates that the target 60, 62 is receiving one of the fluid streams 56, 58.

In an embodiment, the attraction system 50 may include a control system 72 that may operate the attraction system 50 based on the fluid streams 56, 58. The control system 72 includes a memory 74 and a processor 76, such as a microprocessor. The memory 74 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50. The processor 76 may execute the instructions stored on the memory 74. The processor 76 may include any suitable processing circuitry, such as one or more application specific integrated circuits (ASICs), one or more field programmable gate arrays (FPGAs), one or more general purpose processors, or any combination thereof. The control system 72 may be communicatively coupled to each of the sensors 68, 70 such that the control system 72 (e.g., the processor 76) may receive data from the sensors 68, 70. For example, each of the sensors 68, 70 may transmit data (e.g., sensor data) to the control system 72 to indicate whether or not a signal is detected. As a result, the control system 72 may determine whether or not the targets 60, 62 are receiving one of the fluid streams 56, 58 based on the data received from the sensors 68, 70. The control system 72 may also operate the attraction system 50 accordingly based on the data. By way of example, if the sensors 68, 70 are not receiving signals such that the control system 72 is not receiving appropriate data from the sensors 68, 70, the control system 72 may adjust a position and/or an orientation of the fluid sources 52, 54 and/or of the targets 60, 62 so as to enable the sensors 68, 70 of the targets 60, 62 to receive signals of the fluid streams 56, 58.

Additionally or alternatively, the control system 72 may determine the specific fluid stream 56, 58 received by the targets 60, 62. To this end, the control system 72 and/or the sensors 68, 70 may determine parameters of the signals encoded in the fluid streams 56, 58. As an example, the sensors 68, 70 may receive the signals and the control system 72 may determine a frequency modulation, a pulse width modulation, a light color frequency, a light color wavelength, an intensity, a polarization, another suitable parameter, or any combination thereof, of the signals. The sensors 68, 70 may include infrared light data receivers, ultraviolet light data receivers, visible light data receivers, another suitable sensor type, or any combination thereof, that may determine the parameters of the signals. Additionally or alternatively, if the respective signals are visible (e.g., contain a unique visible light), the sensors 68, 70 may include an optical sensor, such as a camera, that may identify and track the signals based the visible parameter of the signals. In this way, the transmitters 64, 66 may output encoded signals having specific parameters such that the signals may be distinguishable from one another (e.g., using frequency modulation, pulse width modulation, light color frequency, light color wavelength, intensity, polarization, and/or another suitable encoding scheme). As such, the fluid streams 56, 58 containing the particular signals may also be distinguishable from one another. Therefore, the data transmitted by the sensors 68, 70 may indicate the parameters of the detected signals, and the control system 72 may decode the signals and analyze the parameters to determine which fluid stream 56, 58 is received by the targets 60, 62.

For instance, the control system 72 may determine that the data transmitted by the first sensor 68 has a parameter associated with the second fluid source 54, thus indicating that the first target 60 is receiving the second fluid stream 58 from the second fluid source 54. Moreover, the control system 72 may determine that the data transmitted by the second sensor 70 has a parameter associated with the first fluid source 52, thus indicating that the second target 62 is receiving the first fluid stream 56 from the first fluid source 52. In this manner, the control system 72 may determine which fluid stream 56, 58 is received by the targets 60, 62 without, for example, having to determine a status (e.g., a position, orientation) of the fluid sources 52, 54. In other words, the parameters of the respective signals encoded into the fluid streams 56, 58 are based on the output by the transmitters 64, 66, and not on a status or a condition of the fluid sources 52, 54, of the targets 60, 62, or of any other part of the attraction system 50. For example, the control system 72 may determine that the first target 60 is receiving the second fluid stream 58 from the second fluid source 54, even though the first fluid source 52 may be positioned closer to the first target 60 and/or even though the first fluid stream 56 of the first fluid source 52 may be directed at or near the first target 60 (e.g., but the first fluid stream 56 is not received by the first target 60).

In a further embodiment, the parameters of the signals encoded in the fluid streams 56, 58 may indicate other information, such as a status of the fluid sources 52, 54. As an example, the parameters may indicate a respective position of the fluid sources 52, 54, a respective condition (e.g., operating mode) of the fluid sources 52, 54, a time of the day, and so forth. In this way, the control system 72 may also operate the attraction system 50 based on the additional information, such as to adjust the operating mode of the fluid sources 52, 54.

Moreover, the encoding and the determination of the signals of the fluid streams 56, 58 may be unidirectionally or bi-directionally performed for a single one of the fluid streams 56, 58. That is, the control system 72 may cause the targets 60, 62 to transmit encoded signals, and/or the fluid sources 52, 54 may include sensors that facilitate determining parameters of a received signal. To this end, the first target 60 may include a third transmitter 78, the second target 62 may include a fourth transmitter 80, the first fluid source 52 may include a third sensor 82, and/or the second fluid source 54 may include a fourth sensor 84. In this way, the sensors 82, 84 of the respective fluid sources 52, 54 may transmit data to the control system 72, and the control system 72 may analyze the data received from the fluid sources 52, 54 to determine information regarding the attraction system 50. In one embodiment, when a stream of fluid strikes a target 60, 62, data is transmitted back through the consistent stream via the signal emitted from the respective target 60, 62 and no data is transmitted from the fluid source 52, 54.

Figure 2:
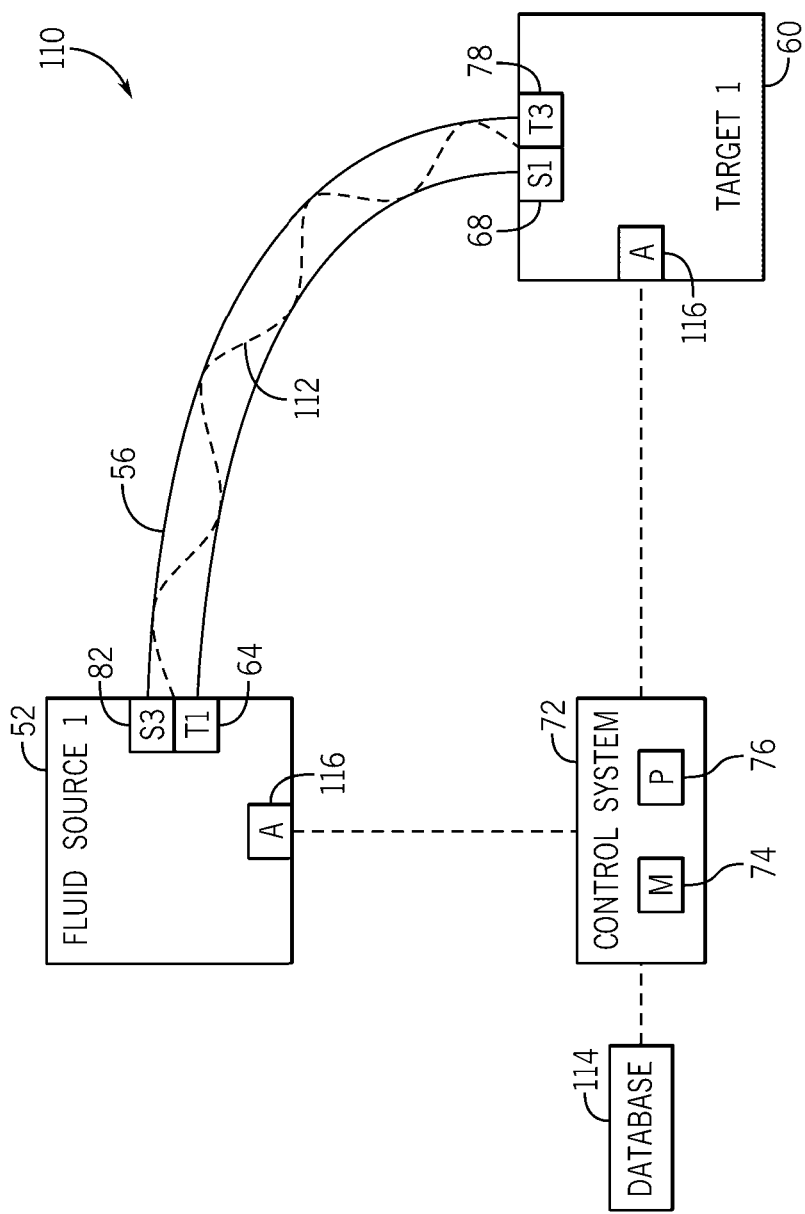
FIG. 2 is a schematic diagram of a fluid system that may be implemented in the attraction system of FIG. 1, in accordance with an aspect of the present disclosure.

FIG. 2 is a schematic diagram of a target-based fluid emission system 110 (fluid system 110) that may be implemented in the attraction system 50 of FIG. 1, according to embodiments of the present disclosure. In the illustrated fluid system 110, the first fluid source 52 emits the first fluid stream 56 toward the first target 60. Moreover, the first fluid stream 56 includes a signal 112 (e.g., a visible light signal) encoded by the control system 72 and output by the first transmitter 64. The first fluid stream 56 may enclose the signal 112 in the first fluid stream 56 via internal reflection (e.g., total internal reflection). As used herein, internal reflection refers to a condition in which the signal 112 is substantially enclosed within a medium, such as the first fluid stream 56, and does not substantially extend out of the first fluid stream 56. For example, internal reflection may be achieved by transmitting the signal 112 to deflect off an edge of the first fluid stream 56 at a particular angle (e.g., greater than a critical angle of the first fluid stream 56). As a result, the signal 112 continues to deflect off the edges of the first fluid stream 56 instead of passing through the first fluid stream 56. Therefore, the signal 112 moves along a flow path of the first fluid stream 56. To achieve desired levels of internal reflection, signals (e.g., light beams) may be emitted at a certain angle relative to the first fluid source 52 (e.g., a nozzle of the first fluid source 52). The first fluid source 52 may be controlled to provide a stream geometry that facilitates internal reflection.

In an embodiment, the internal reflection may be total internal reflection such that substantially an entirety of the signal 112 may move through the first fluid stream 56, and the parameters of the signal 112 are substantially unchanged as the signal 112 travels through the first fluid stream 56. Even when slight variations occur to the first fluid stream 56 over time, signals will continue to pass through the first fluid stream 56 during phases of proper alignment of stream geometry and signal emissions. In this way, regardless of the flow path of the first fluid stream 56 (e.g., a straight path, a curved path), the parameters of the signal 112 remain substantially the same at any section of the first fluid stream 56. To enable the first fluid stream 56 to effectively enclose the signal 112 via total internal reflection, the first fluid source 52 may emit the first fluid stream 56 in a substantially laminar flow. Further, the first fluid stream 56 may be controlled (e.g., based on a modeling algorithm or table) to provide a geometry or flow path conducive for signal transmission. As such, the flow of the first fluid stream 56 may generally be a smooth and unbroken fluid flow with an appropriate arc, rather than a turbulent fluid flow with a geometry that prevents an appropriate level of internal reflection. Indeed, an interference of the conducive flow of the first fluid stream 56 may affect the signal 112, such as by changing the parameters of the signal 112 and/or terminating the signal 112. Such interference may include another fluid stream intersecting with the first fluid stream 56, an object (e.g., air) that breaks the flow of the first fluid stream 56, and/or a transition of the first fluid stream 56 from a laminar flow to a turbulent flow. In an additional or alternative embodiment, the internal reflection may not be total internal reflection, and a portion of the transmitted signal may pass through the first fluid stream 56 instead of reflecting within the first fluid stream 56. For example, the first fluid stream 56 may not be completely laminar and/or the signal 112 may not be transmitted at a particular angle to enable total internal reflection. For this reason, a parameter of the signal 112 may change along the path of the first fluid stream 56. However, enough of the signal 112 may transmit through the first fluid stream 56 to be received by one of the sensors 68, 70 such that a desirable amount of internal reflection is achieved.

In an embodiment, the first fluid source 52 includes the first transmitter 64, and the first target 60 includes the first sensor 68. The control system 72 may cause the first transmitter 64 to output the encoded signal 112 into the first fluid stream 56. For instance, when the first fluid source 52 emits the first fluid stream 56, the control system 72 may activate the first transmitter 64 to output the encoded signal 112 into the first fluid stream 56. In some cases, the control system 72 may operate both the first fluid source 52 and the first transmitter 64 and, as such, causes the first fluid source 52 to emit the first fluid stream 56 while causing the first transmitter 64 to output the encoded signal 112 into the first fluid stream 56. As such, the first transmitter 64 may remain active while the first fluid source 52 emits the first fluid stream 56. Moreover, the control system 72 may operate the first sensor 68 to remain active during operation of the fluid system 110 such that the first sensor 68 may readily receive the signal 112 at any time. In this way, the first sensor 68 may transmit data to the control system 72 in real-time to determine the status of the first fluid stream 56. For example, if the target 60 does not receive the first fluid stream 56, the first sensor 68 may not transmit data indicative of the receipt of the signal 112, and/or the first sensor 68 may transmit data indicative that the sensor 68 is not receiving the signal 112. If the target 60 does receive the first fluid stream 56, the first sensor 68 may then transmit data associated with the signal 112 to the control system 72.

In an additional or alternative embodiment, the first target 60 includes the third transmitter 78, which may output the encoded signal 112 into the first fluid stream 56 emitted by the first fluid source 52, and the first fluid source 52 includes the third sensor 82, which may receive the signal 112. As an example, the control system 72 may operate the third transmitter 78 such that the signal 112 is constantly transmitting regardless of whether the first target 60 receives the first fluid stream 56. However, the third sensor 82 of the first fluid source 52 may receive the signal 112 only when the first target 60 receives the first fluid stream 56. That is, if the first fluid stream 56 does not extend from the first fluid source 52 to the first target 60, the transmitter 78 is not able to transmit the signal 112 through the first fluid stream 56. As such, the third sensor 82 does not receive the signal 112 and does not transmit data indicative of receipt of the signal 112 to the control system 72. However, if the first fluid stream 56 does extend from the first fluid source 52 to the first target 60, the signal 112 transmitted by the third transmitter 78 may travel through the first fluid stream 56 to be received by the third sensor 82. As a result, the third sensor 82 may transmit data associated with the signal 112 to the control system 72. Indeed, either the first fluid source 52 or the first target 60 may transmit the signal 112 and the other of the first fluid source 52 or the first target 60 may transmit data associated with the signal 112 to the control system 72.

Further, in an embodiment, multiple signals may be simultaneously encoded into the first fluid stream 56. For instance, the first fluid source 52 and/or the first target 60 may each include multiple transmitters, and each of the transmitters may output a respective encoded signal into the first fluid stream 56 at the same time. As an example, one of the signals may include visible light (e.g., to provide a decorative coloration effect of the first fluid stream 56), and another of the signals may include infrared light (e.g., to transmit data with which the control system 72 uses to operate the fluid system 110). As another example, each signal may include respective data that is used by the control system 72 to perform an operation. In other words, the control system 72 may receive multiple data via the first fluid stream 56 to operate the fluid system 110.

Although the illustrated fluid system 110 includes the first fluid source 52 that may direct the first fluid stream 56 to the first target 60, an additional or alternative fluid system 110 may include the first fluid source 52 as directing the first fluid stream 56 to another fluid source instead of a target. In other words, one fluid source may also be able to receive fluid streams and signals from another fluid source, and the fluid source receiving the signal may transmit data to the control system 72 to indicate that the fluid source has received the signal. In this way, each fluid source may also act as a target.

In an embodiment, the control system 72 may adjust the operation of the transmitters 64, 78 to specify the parameters of the signal 112. By way of example, the control system 72 may cause the first transmitter 64 to output the signal 112 having a particular parameter (e.g., having a certain value) detectable by the first sensor 68. Upon receipt of the signal 112, the first sensor 68 of the first target 60 may then transmit data to the control system 72 to indicate the particular parameter. As a result, the control system 72 may then determine that the first target 60 specifically received the first fluid stream 56 emitted by the first fluid source 52.

The control system 72 may also be communicatively coupled to a database 114 (e.g., a physical server, a cloud computing device), which may store certain information relevant to the operation of the fluid system 110 and/or of the attraction system 50. In an example, the database 114 may store data (e.g., a database table) associating the parameters of the signal 112 with various information, and the control system 72 may access the database 114 to operate the transmitters 64, 66 accordingly to transmit the signal 112. In another example, the database 114 may store information that is updated based on the detection of the signal 112 by the sensors 68, 82. For instance, the first fluid source 52 may be associated with and operated by a particular guest, and the database 114 may store information regarding the guest, such as a guest or user profile and/or a number of points assigned to the guest. The guest may operate the first fluid source 52 to direct the first fluid stream 56 toward the first target 60, and the control system 72 may update the number of points assigned to the guest based on whether the first target 60 receives the first fluid stream 56. In one embodiment, the control system 72 may assign more points based on time (e.g., the longer the guest is able to hit the first target 60 with the first fluid stream 56). In an additional or alternative embodiment, the control system 72 may assign more points based on frequency (e.g., the more times the guest is able to hit the first target 60 with the first fluid stream 56). Indeed, if multiple fluid sources associated with different, respective guests are implemented, the control system 72 may determine the particular fluid stream received by the first target 60 (e.g., based on determining the parameter of the signal 112 correlates with a signal encoded by the transmitter of the particular fluid source and received by the first sensor 68 of the first target 60), and update the points assigned to the corresponding guest accordingly. Further, if multiple targets are implemented, each target may be associated with a distinct point value, and the control system 72 may determine the particular target receiving the fluid stream of the first fluid source 52 (e.g., based on determining the signal encoded by the transmitter of the target and received by the third sensor 82 of the first fluid source 52), and update the points stored in the database 114 in accordance to the specific target.

The control system 72 may further perform another action in response to the receipt of the signal 112 and/or based on the determined parameters of the signal 112. As an example, the first fluid source 52 and the first target 60 may each include a respective actuator 116, and the control system 72 may activate either of the actuators 116 to move the first fluid source 52, the first target 60, and/or another component of the attraction system 50. As another example, the control system 72 may output a notification, such as to present a visual display (e.g., a light), present an audio output (e.g., a sound effect), transmit information to a mobile device, and the like, to indicate a successful target strike based on the parameter of the signal 112. As a further example, the control system 72 may change an operation of the attraction system 50, such as a manner (e.g., a flow direction, a flow rate) in which the first fluid source 52 emits the first fluid stream 56. Indeed, the control system 72 may perform any suitable action based on the signal 112 being received by one of the sensors 68, 82.

Figure 3:
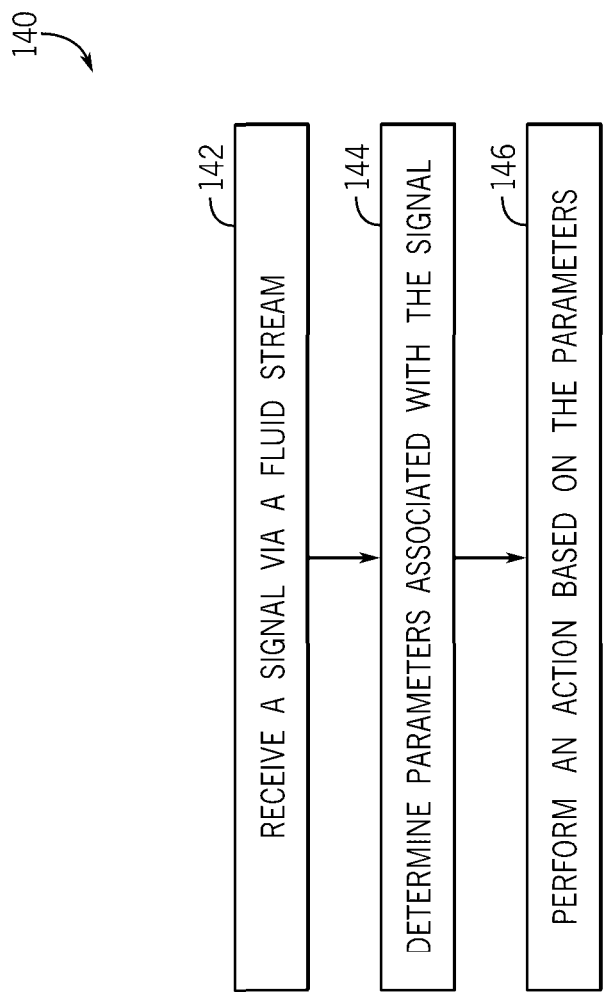
FIG. 3 is a flowchart of a method for operating the attraction system of FIG. 1 based on data encoded in a signal received via a fluid stream, in accordance with an aspect of the present disclosure.
Figure 4:
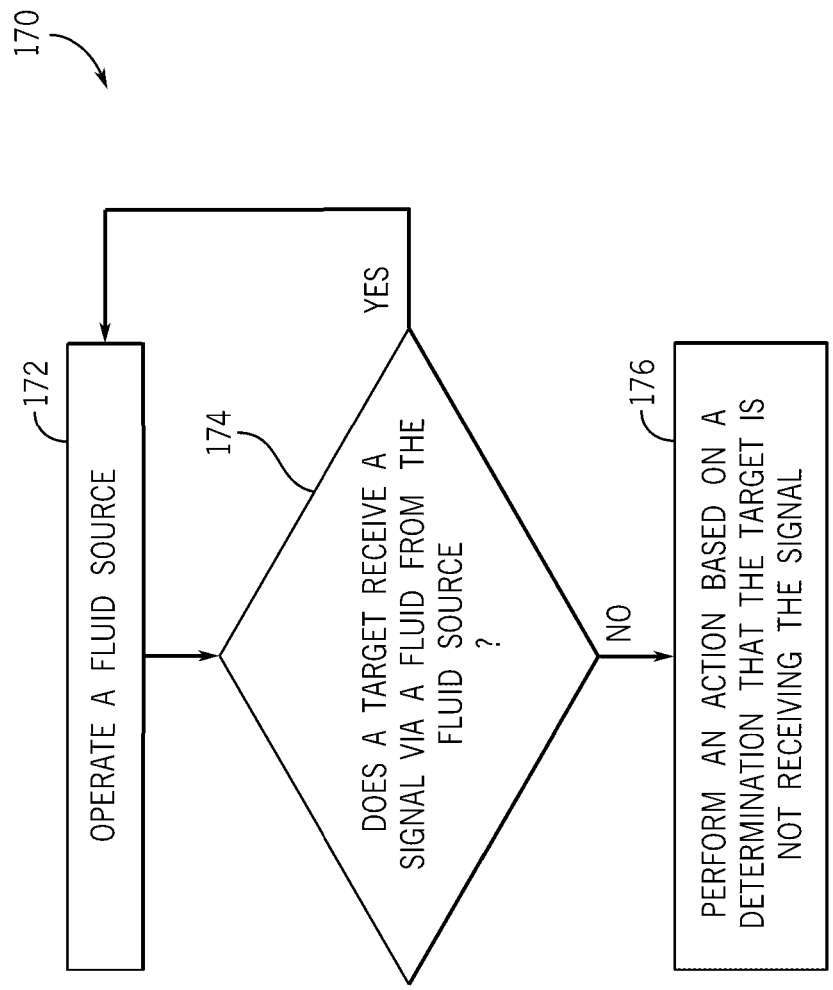
FIG. 4 is a flowchart of a method for operating the attraction system of FIG. 1 based on whether a signal is received via a fluid stream, in accordance with an aspect of the present disclosure.

FIGS. 3 and 4 illustrate respective methods for operating an attraction system, such as the attraction system 50 of FIG. 1, using the fluid system 110 of FIG. 2. Although FIGS. 3 and 4 primarily discuss that the steps of each method are performed by the control system 72, it should be noted that the steps of each method may be performed by any suitable system, such as multiple controllers. It should also be noted that the steps of each method may be performed differently in another embodiment, such as for a different embodiment of the attraction system. For example, additional steps may be performed, and/or certain steps of each method may be modified, removed, and/or performed in a different order.

FIG. 3 is a flowchart of a method 140 for operating the attraction system 50 of FIG. 1 based on data received via a signal, according to embodiments of the present disclosure. At block 142, the control system receives a signal via a fluid stream. For example, a sensor communicatively coupled to the control system may receive the signal (e.g., an infrared or visible light signal) encoded into the fluid stream and internally reflected within the fluid stream until receipt by the sensor. Upon receiving the signal, the sensor may transmit the signal to the control system. In an embodiment, a fluid source transmits the encoded signal into the fluid stream emitted by the fluid source, and a sensor of a target may receive the signal. For instance, a physical target receives a fluid stream from a particular user water cannon from a collection of user water cannons. The sensor of the target may receive the signal via the fluid stream to transmit data indicative of the particular water cannon as discerned from the collection of user water cannons. In an additional or alternative embodiment, the target transmits the encoded signal into the fluid stream upon receipt of the fluid stream, and a sensor of the fluid source may receive the signal from the target. By way of example, a particular physical target of a collection of physical targets receives the fluid stream from the user water cannon. The sensor of the user water cannon may receive the signal to transmit data indicative that the particular physical target of the collection of physical targets has been struck by fluid stream of the user water cannon.

At block 144, the control system determines parameters (e.g., a color, a wavelength, a pulse value) associated with the signal. For example, the data received from the sensor indicates the parameters of the signal. As a result, upon receipt of the data, the control system is able to determine such parameters accordingly. As discussed above, the parameters may facilitate identifying the fluid source emitting the fluid stream. At block 146, the control system performs an action based on the parameters of the signal. Such actions may be based on the particular implementation of the attraction system and the fluid system.

In one example, the attraction system may be a shooting range-like setting having targets positioned at various locations (e.g., on various props). Further, guests may operate respective fluid sources and may be attempting to direct respective fluid streams to hit the targets. Certain targets may be more difficult to hit, and such targets may therefore be associated with greater point values. Moreover, the database may store points associated with each guest (e.g., associated with their respective fluid sources). As each guest manages to hit targets with their respective fluid sources, the control system may update the database to add points to the corresponding guests based on the target that has been hit. For instance, based on data indicative that a first target has received a first fluid stream from a first fluid source of a first guest, the control system may update the database to add points to a first user profile associated with the first guest. Further, based on data indicative that a second target has received a second fluid stream from a second fluid source of a second guest, the control system may accordingly update the database to add points to a second user profile associated with the second guest. In this embodiment, the signal may also include parameters that indicate an operating mode of the attraction system, such as a game mode of the shooting attraction (e.g., to accumulate the most points in a timed setting, to hit specifically designated targets). Each game mode may include a specific manner in which the control system may update the database to add points to user profiles. For this reason, the control system may select the manner to update the database based on the parameter of the signal.

In an additional example, the attraction system may be a laser tag-like activity in which each guest may operate a respective fluid source and may include a respective target (e.g., attached to a clothing item of each guest). The control system may update the database based on data indicative of a target associated with one guest is receiving a fluid stream of a fluid source associated with another guest. For example, based on data indicative that a first target of a first guest has received a first fluid stream from a second fluid source of a second guest, the control system may update the database to reduce points from a first user profile associated with the first guest and also to add points to a second user profile associated with the second guest. In this example embodiment, further parameters of the signal may be encoded. For instance, each guest may be associated with a particular team, and the fluid source of the guest may encode a signal that causes the fluid stream to be a particular color based on the team associated with the guest. That is, a subset of fluid sources within the same team may encode respective signals having the same visible light wavelength parameter. In this way, the fluid sources of each team may emit a particularly colored fluid stream. By way of example, fluid sources associated with a first team may emit fluid streams having a first visible light wavelength (e.g., a first color), and fluid sources associated with a second team may emit fluid streams having a second visible light wavelength (e.g., a second color) that is different from the first visible light wavelength. Moreover, each signal may indicate additional information regarding each guest and their associated user profile, such as an amount of health points (e.g., which may be displayed to the guest), a type of fluid source equipped (e.g., having a fluid stream associated with a particular point adjustment when received by a target), and the like, and such information may also affect the manner in which the control system may update the database based on received data.

In a further example, the attraction system may include a drink machine (e.g., the first fluid source 52 of FIG. 2) that contains various drinks, and the control system (e.g., the control system 72 of FIG. 2) may perform an action associated with providing a particular drink to a guest. For instance, the guest may have a container (e.g., the first target 60 of FIG. 2), such as a cup, which may include a transmitter (e.g., the third transmitter 78) that transmits an encoded signal (e.g., the signal 112 of FIG. 2) having parameters based on a desirable drink indicated by the guest. The guest may provide the container to the drink machine, and the drink machine may initially emit a fluid stream (e.g., the first fluid stream 56 of FIG. 2) to the container in a laminar flow such that the signal transmits through the fluid stream and is received by a sensor (e.g., the third sensor 82) of the drink machine. The sensor may transmit data indicative of parameters of the signal to the control system, the control system may select a specific drink based on the parameters of the signal, and the control system may cause the drink machine to provide the specific drink to the container of the guest.

FIG. 4 is a flowchart of an embodiment of a method 170 for operating the attraction system based on whether a signal is received, rather than based on a specific parameter of the signal, according to embodiments of the present disclosure. At block 172, the control system operates a fluid source of the attraction system. By way of example, the control system automatically operates the fluid source to emit the fluid stream, such as toward a target, without a user input.

At block 174, the control system determines whether the target receives a signal that is encoded in the fluid emitted by the fluid source. In an embodiment, the fluid source transmits the encoded signal into the fluid, and a sensor of the target may receive the signal. The sensor may then transmit data to the control system to indicate that the target is receiving the fluid stream. In an additional or alternative embodiment, the target transmits the signal, and a sensor of the fluid source may receive the signal. Thus, upon receipt of the fluid, the signal transmitted by the target may transmit through the fluid to be received by the sensor of the fluid source. The sensor of the fluid source may then transmit data to the control system to indicate that the target is receiving the fluid stream. If the data indicates that the target is receiving the signal, the control system may continue to operate the attraction system (e.g., without changing the operation of the attraction system).

However, if the control system determines that the target is not receiving the signal, the control system may perform a different action, as indicated at block 176. As an example, the control system may adjust an operation of the attraction system, such as to change a position of the fluid source and/or of the target such that the target may receive the fluid. As another example, the control system may present a notification to inform a user, such as an operator of the attraction system, that the target is not receiving the fluid. In this way, the user may adjust the attraction system accordingly, such as by manually moving the fluid source and/or the target such that the target may receive the fluid.

By way of example, the attraction system may include a fountain in which it is desirable for the fountain to emit a fluid stream to a particular location. As such, the particular location may include the target that may determine whether the fountain emits the fluid stream as desired. If the target receives the fluid, the target may transmit data to the control system to indicate that the target is receiving the fluid, and the control system may therefore continue to operate the attraction system to cause the fountain to emit the fluid to the target. If the target does not receive the fluid, the target may not transmit data to the control system, thereby indicating that the target is not receiving the fluid, and the control system may therefore perform an action that may cause the operation of the attraction system to change such that the fountain emits the fluid to the target. Additionally or alternatively, if the target does not receive the fluid, the target may transmit data to the control system to indicate that the target is not receiving the fluid, and if the target does receive the fluid, the target may transmit data to the control system to indicate that the target is receiving the fluid.

Further, although FIG. 4 illustrates that the control system may perform an action based on the determination that the target is not receiving the signal, the control system may alternatively perform an action based on the determination that the target is receiving the signal. That is, it may not be desirable for the target to receive the fluid and therefore, the control system may perform an action upon determining that the target is receiving the fluid. In any case, the control system may operate the attraction system based on whether or not the target is receiving the signal, rather than based on the particular parameters associated with the signal.

Moreover, the steps of the method 140 and of the method 170 may be combined. For instance, multiple fountains may be emitting respective fluid streams near the target, and it may be desirable for the target to receive a specific fluid stream. Thus, each fluid stream may have a respective, unique signal. The control system may therefore determine whether the target is receiving a fluid stream based on receipt of a signal and further, the control system may determine whether the target is receiving the specific fluid stream based on a parameter of the signal. The control system may then operate the attraction system, such as by moving the target and/or the fountain, based on such determination.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
   a fluid source configured to emit a fluid stream with a geometry that facilitates internal reflection;
   a transmitter configured to transmit a signal through the fluid stream such that the signal is enclosed in the fluid stream via the internal reflection, wherein the signal comprises a parameter;
   a sensor configured to receive the signal via the fluid stream and provide data indicative of the parameter; and
   a control system communicatively coupled to the sensor, wherein the control system comprises a processor and a memory, wherein the memory comprises instructions that cause the processor to:
   receive the data indicative of the parameter from the sensor; and
   operate the attraction system based on the parameter.

2. The attraction system of claim 1, comprising a target configured to receive the fluid stream emitted by the fluid source, wherein the target comprises the sensor.

3. The attraction system of claim 2, wherein the fluid source comprises the transmitter.

4. The attraction system of claim 1, wherein the control system is communicatively coupled to a database of the attraction system, and the control system is configured to update the database based on the parameter.

5. The attraction system of claim 1, wherein the parameter comprises a unique identifier associated with the fluid source.

6. The attraction system of claim 5, wherein the memory comprises instructions that cause the processor to determine the unique identifier by decoding the data indicative of the parameter.

7. The attraction system of claim 1, wherein the control system is configured to operate the attraction system based on not receiving appropriate data from the sensor.

8. The attraction system of claim 7, wherein the fluid source comprises an actuator, and the control system is configured to activate the actuator to move the fluid source in response to not receiving the appropriate data from the sensor.

9. A fluid system, comprising:
   a fluid source configured to emit a fluid stream having a geometry that facilitates internal reflection;
   a target configured to receive the fluid stream emitted by the fluid source;
   a transmitter configured to transmit a signal into the fluid stream such that the signal travels through the fluid stream via the internal reflection, wherein the signal comprises a parameter;
   a sensor configured to receive the signal via the fluid stream, wherein the sensor is configured to transmit data based on the signal; and
   a control system communicatively coupled to the sensor, wherein the control system comprises a processor and a memory, wherein the memory comprises instructions that cause the processor to:
   receive the transmitted data from the sensor;
   determine the parameter based on the transmitted data; and
   operate the fluid system based on the parameter.

10. The fluid system of claim 9, wherein the target comprises the transmitter, and the fluid source comprises the sensor.

11. The fluid system of claim 10, comprising an additional target configured to receive the fluid stream emitted by the fluid source, wherein the additional target comprises an additional transmitter configured to transmit an additional signal through the fluid stream via the internal reflection, wherein the additional signal comprises an additional parameter, wherein the sensor is configured to receive the additional signal via the fluid stream, and wherein the control system is configured to:
  receive the additional signal from the sensor;
  determine the additional parameter from the additional signal; and
  operate the fluid system based on the additional parameter of the additional signal.

12. The fluid system of claim 11, comprising a database accessible by the control system, wherein the database is configured to store a user profile associated with the fluid source, and the control system is configured to:
  update the user profile based on the parameter in response to receiving the transmitted data from the sensor;
  update the user profile based on the additional parameter in response to receiving the additional signal from the sensor; or
  both.

13. The fluid system of claim 9, wherein the memory comprises instructions that cause the processor to identify the fluid source from a plurality of fluid sources based on the parameter.

14. The fluid system of claim 9, wherein the fluid source and the target each comprise a respective actuator, and the control system is configured to activate the actuator of the fluid source to move the fluid source, activate the actuator of the target to move the target, or both, based on the parameter.

15. An attraction system, comprising:
  a first fluid source configured to emit a first fluid stream capable of internal reflection;
  a first transmitter configured to transmit a first signal having a first parameter through the first fluid stream via the internal reflection;
  a second fluid source configured to emit a second fluid stream capable of internal reflection;
  a second transmitter configured to transmit a second signal having a second parameter through the second fluid stream via the internal reflection;
  a target comprising a first sensor configured to receive signals including the first signal through the first fluid stream and the second signal through the second fluid stream; and
  a control system communicatively coupled to the first sensor, wherein the control system comprises a processor and a memory, wherein the memory comprises instructions that cause the processor to:
    receive data from the first sensor, wherein the data is indicative of a received parameter of a received signal;
    identify the first fluid source when the received parameter correlates to the first parameter; and
    identify the second fluid source when the received parameter correlates to the second parameter.

16. The attraction system of claim 15, wherein the control system is configured to provide an indication of a successful target strike based on the received parameter correlating to the first parameter or the second parameter.

17. The attraction system of claim 15, comprising a database accessible by the control system, wherein the database is configured to store a plurality of user profiles, wherein each user profile of the plurality of user profiles is associated with a fluid source of a plurality of fluid sources, and wherein the control system is configured to:
  identify and update a first user profile associated with the first fluid source in response to identifying the first fluid source when the received parameter correlates to the first parameter; and
  identify and update a second user profile associated with the second fluid source in response to identifying the second fluid source when the received parameter correlates to the second parameter.

18. The attraction system of claim 17, wherein the target comprises a third transmitter configured to transmit a third signal through the first fluid stream and/or the second fluid stream, wherein the third signal is indicative of a third parameter, wherein the first fluid source comprises a second sensor configured to receive the third signal through the first fluid stream, and the second fluid source comprises a third sensor configured to receive the third signal through the second fluid stream.

19. The attraction system of claim 18, wherein the control system is configured to:
  receive additional data from the first sensor and/or the second sensor, wherein the additional data is indicative of the third parameter of the third signal;
  update the first user profile based on the third parameter in response to identifying the first fluid source when the received parameter correlates to the first parameter; and
  update the second user profile based on the third parameter in response to identifying the second fluid source when the received parameter correlates to the second parameter.

20. The attraction system of claim 15, wherein the first parameter includes a first visible light wavelength, and the second parameter includes a second visible light wavelength.

* * * * *